United States Patent [19]
Giordano et al.

[11] 3,799,570
[45] Mar. 26, 1974

[54] TRIM CORRECTORS FOR MOTOR VEHICLES

[75] Inventors: Jean Louis Giordano; Jacques Touchard, both of Billancourt, France

[73] Assignees: Regie Nationalees Usines Renault, Billancourt; Automobiles Peugeot, Paris, both of, France

[22] Filed: Mar. 2, 1972

[21] Appl. No.: 231,127

[30] Foreign Application Priority Data
Mar. 4, 1971  France .............................. 71.07435
Feb. 8, 1972  France .............................. 72.04188

[52] U.S. Cl. ............................ 280/124 F, 280/6 H
[51] Int. Cl. ............................................. B60g 17/00
[58] Field of Search .................... 280/124 F, 6, 6.1

[56] References Cited
UNITED STATES PATENTS
3,560,017  2/1971  Vogel ............................ 280/124 F
3,574,352  4/1971  Elliott ........................... 280/124 F
3,558,156  1/1971  Jackson ......................... 280/124 F

*Primary Examiner*—Philip Goodman
*Attorney, Agent, or Firm*—Stevens, Davis, Miller & Mosher

[57] ABSTRACT

This trim corrector comprises a vessel for the storage of gas under pressure and pneumatic actuators controlling the trim of the vehicle, the gas circulation in the various elements being provided by only one single-acting compressor having a low compression ratio, housed in the vessel under pressure and started automatically when a gas transfer is necessary.

This gas transfer is caused by the actuation of the compressor under the control of a signal from a detector of the trim, level or height of the vehicle body and through a time-lag device of a type known per se and a two-position pressure-responsive differential switch responsive to the pressure prevailing in the vessel.

5 Claims, 8 Drawing Figures

TRIM CORRECTORS FOR MOTOR VEHICLES

The present invention relates to devices for correcting the trim or level of a motor vehicle, and has specific reference to a so-called closed-circuit pneumatic device of this character.

Pneumatic trim correcting devices for motor vehicles are already known, notably those of the aforementioned "closed circuit" type, wherein the gas used for correcting the trim or height of the vehicle body, which is accomplished by inflating pneumatic cylinder and piston units or actuators, is simply atmospheric air. Moreover, when a correction has to be effected in the opposite direction for lowering the vehicle body for exhausting the aforesaid pneumatic units or actuators, an excess of air is usually released to the atmosphere. Now these devices require particular care for removing any dust from the air introduced into the system, and also for drying this air. Furthermore, the compressor sucking air from the surrounding atmosphere (of course at the atmospheric pressure) for delivering same into the cylinder and piston actuators or units operating at 116 psi, must have reliable compression characteristics and be driven from powerful means.

"Closed circuit" trim correcting devices for motor vehicles are also known wherein the gas used for inflating the pneumatic actuators is taken from a storage vessel or accumulator also adapted to collect the excess gas escaping from these actuators when the vehicle body is lowered. In this system the gas is recycled and delivered continuously, by the compressor housed within said vessel inserted in the pneumatic circuit, alternatively to the actuators and to the storage vessel. The chief inconvenience of these correctors lies in the fact that due to the porosity of wall elements and also to leaks occurring at various seals and gaskets the amount of gas introduced initially decreases with time, so that fresh amounts of make-up gas must be introduced into the system for preserving its full efficiency. Moreover, for the same purpose, the arrangement must necessarily incorporate two single-acting compressors, in order to inflate in succession on the one hand only the actuators and on the other hand only the storage vessel.

In a former French patent No. 71/02290 filed by the same Applicants on Jan. 25, 1971 means are described for avoiding the above-mentioned inconveniences by providing an automatic trim corrector of the closed-circuit type, which is adapted automatically to make up any loss in the amount of gas introduced initially into the system, by using a device comprising a single compressor of the single-acting type, in lieu of two compressors as in the preceding case, in conjunction with a suitable arrangement comprising solenoid-operated valves and diodes.

The pneumatic trim correcting device according to the present invention constitutes a marked improvement in the corrector disclosed in the above-mentioned patent, which affords a considerable simplification of the pneumatic and electric circuit means while eliminating certain elements hitherto considered as absolutely necessary, such as pressure-responsive switches, solenoid-operated valves, electric capacitors and relays.

It is the essential object of the present invention to provide a pneumatic closed circuit trim corrector, that is, a device for correcting the trim or level of a motor vehicle, of the type comprising a storage vessel for accumulating gas under pressure and pneumatic cylinder and piston actuators for controlling the trim of the vehicle body, wherein the gas circulation through the various component elements of the circuit is produced by means of a single, single-acting compressor of relatively low compression ratio, housed in the pressure gas storage vessel and adapted to be started automatically when a gas transfer becomes necessary, this device being characterized in that the gas transfer is obtained by operating a single-acting compressor the operation of which is started by a signal from a vehicle body level or trim detector and a timing or time-lag device of a type known per se through a two-position pressure-operated switch responsive to the pressure prevailing in said storage vessel, said signal further controlling the condition of a pair of solenoid-operated, three-way valves disposed in parallel and each pneumatically connected through a first way to the compressor inlet, through a second way to the compressor outlet and through the third way to said storage vessel in the case of the first valve and to said pneumatic cylinder-and-piston actuators in the case of the other valve.

Since the total amount of air contained in the vessel and actuators is constant, any pressure variation occurring in the vessel is compensated by a pressure variation in the opposite direction in said actuators, and vice versa. In other words, if the air pressure increases in the vessel it decreases in the cylinder-and-piston actuators, and vice versa.

As a consequence of this specific arrangement the two faces of the compressor piston are exposed to different pressures generally of the order of 114 to 115 psi, and the greater the pressure differential, the higher the staring torque of the compressor itself.

It is another object of this invention to reduce this starting torque and consequently the magnitude of the power to be delivered thereto by reducing the maximum value of the pressure likely to prevail or build up in the vessel by resorting to a calibrated valve adapted to vent the excess air to the surrounding atmosphere when the air pressure in the vessel exceeds a predetermined threshold.

Other features and advantages of this invention will appear as the following description proceeds with reference to a specific form of embodiment thereof given by way of illustration with reference to the attached drawings, in which.

Figure 1:
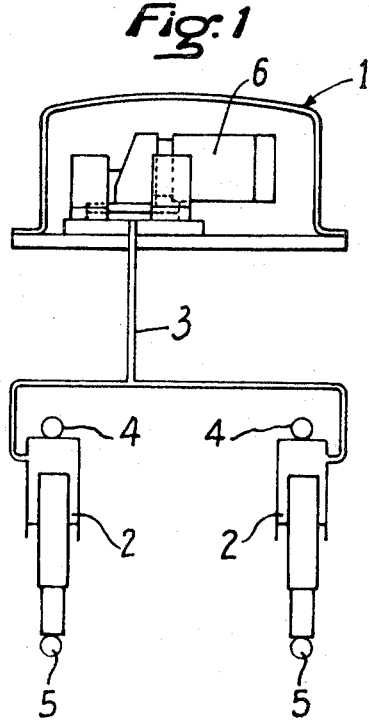
FIG. 1 illustrates a general and very diagrammatic view of the system comprising the motor-compressor, a storage vessel and cylinder-and-piston actuators for correcting the trim or vertical level of the body of a motor vehicle.

Referring first to FIG. 1, the storage vessel 1 secured to the chassis of the motor vehicle is connected to a pair of cylinder-and-piston actuators 2 associated with a same train of wheels through pipe line 3 permitting the passage of the inflation gas to and from the vessel. The upper portion 4 of actuators 2 is connected to the vehicle body and their lower portions 5 are connected to the train of wheels. The power-driven compressor 6 is enclosed in said vessel, in which a certain overpressure is maintained. It is clear that, when the circuit is closed, inflating the vessel will cause a corresponding deflation of the actuators, thus reducing the height of the vehicle body, and vice versa.

Figure 2:
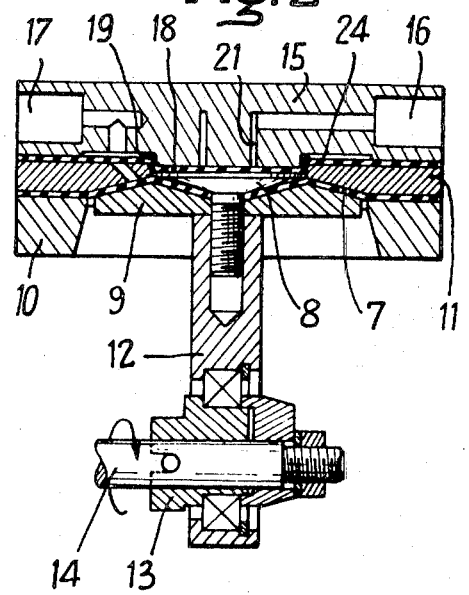
FIGS. 2 and 3 illustrate on a considerably larger scale, in axial section, a typical diaphragm-type compressor adapted to be used in the device of this invention, in the positions corresponding to the end of the delivery period and to the beginning of the suction period, respectively.
Figure 3:
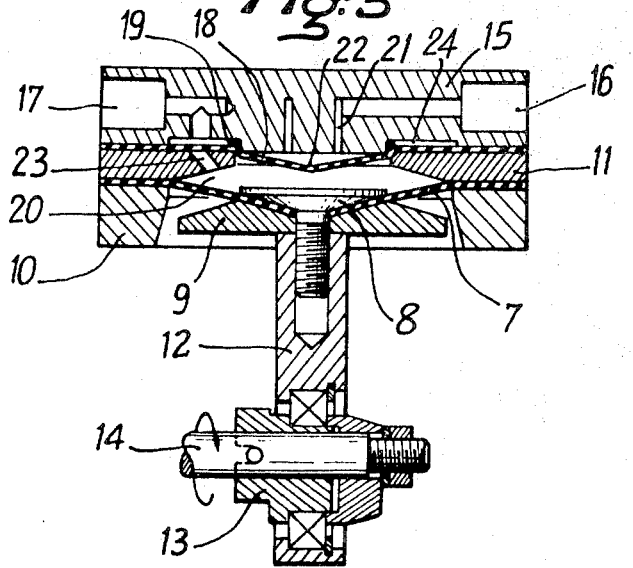
Figure 4:
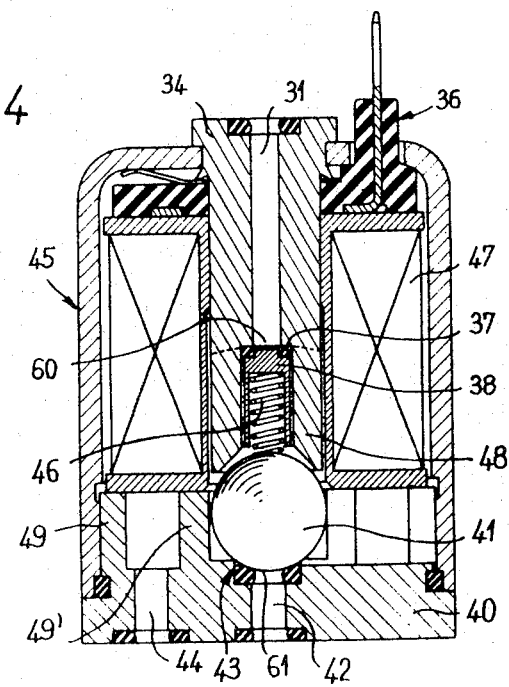
FIG. 4 is an enlarged axial vertical section taken through a solenoid-operated valve utilized in this device.

The diaphragm-type compressor adapted to produce these gas transfers will now be described with reference to FIGS. 2 and 3 in which it is shown in detail.

A main, moderately deformable diaphragm 7, for example of reinforced rubber material or like material, has its central portion clamped between a pair of concentric, matching members 8, 9; on the other hand, it is clamped in a fluid-tight manner between the annular base member 10 and an intermediate member 11 through which at least one passage 23 is formed. The lower member 9 is rigid with a rod 12 connected through an eccentric member 13 to a driving shaft 14.

The upper portion of the compressor comprises a head 15 formed with an inlet port 16 and an exhaust or outlet port 17 for the gas circulating in the close-circuit system.

Another diaphragm 18 is clamped in a fluid-tight manner, with the assistance of a gasket 19, between said head 15 and the intermediate member 11.

As a consequence of its rotation the shaft 14 imparts through the eccentric 13 a reciprocating motion to the piston comprising the diaphragm 7 and said concentric members 8 and 9. During a first period, as the rod 12 is lowered, a chamber 20 is formed and the resulting depression separates the diaphragm 18 from the head 15. The gas penetrating through the inlet port 16 flows through the annular passage 21 and then through a central orifice 22 of diaphragm 18 to the aforesaid chamber 20 where it accumulates, as illustrated in FIG. 3.

During a second compression period, the piston still driven from the assembly comprising shaft 14, eccentric 13 and rod 12, rises and reduces the volume of chamber 20. Thus, the gas is compressed and forced through passages 23 of member 11, thus lifting the diaphragm portion corresponding to the annular groove 24 of head 15. Orifices formed in this portion of diaphragm 18 are not coincident with said passages 23 and are thus uncovered, so that the gas can flow through the diaphragm and escape. During this operation, the diaphragm and its central orifice 22 are pressed against the head 15 so that the air cannot escape through passage 21, since the two passages 22 and 21 do not register with each other. At the end of this operation, the compressor is in the position shown in FIG. 2.

As another cycle begins, the gas suction takes place as explained hereinabove through inlet port 16, excepting the other port 17, since the peripheral portion of diaphragm 18 is pressed against the concentric member 11 and the diaphragm orifices are not coincident with the passage 23 of member 11 in this position.

The power-driven compressor 6 is started automatically when the initial inflation of the vessel is required. This starting operation is also controlled when a leak is detected in the vessel and when a change occurs in the load of the vehicle, as will be explained presently.

In FIG. 47 it will be seen that an electromagnet 4 adapted to be supplied with energizing current through a terminal 36 is enclosed in a case 45 and is carried by support means 49, 49' provided in a base member 40 comprising two passages 42, 44. The support means 49, 49' does not prevent any air communication between the two passages 42, 44. The central portion of electromagnet 47 is occupied by a core 34 projecting from the top of said case 45 and formed with a longitudinal passage 31.

The lower portion of core 34 terminates with truncated fins 48 of which the lower edges constitute a frustoconical bearing element engageable by the top of a ball valve 41 engaging on its opposite face with an O-ring 43 acting as a seat and sealing or isolating the ingress of passage 42. The axial passage 31 of core 34 has a greater diameter along the fins 48, as shown, to permit the fitting therein of a cylindrical valve member 38 formed with a blind bore extending upwars from its base, as shown, for containing a coil compression spring 46 bearing with its upper end against the bottom of said blind bore and with its lower end against the top of said ball valve 41. Said cylindrical valve member 38 is urged by spring 46 through the medium of an O-ring or like seal 37 against the lower end of said axial passage 31. When the electromagnet is de-energized, the valve member 38 is lowered by the air pressure penetrating into said passage 31, so that the gas can flow between the fins 48 and support means 49, 49' towards passage 44, however without penetrating into the other passage 42, due to the presence of ball valve 41.

The passages 42 and 31 are connected the to the compressor inlet and the latter to the compressor outlet respectively, and passage 44 communicates either with the actuators 2 via a solenoid-operated valve 51, or with vessel 1 via another solenoid-operated valve 50, as will be explained with reference to FIGS. 5 to 7 of the drawing.

When current flows through the winding 47 the ball valve 41 is attracted towards passage 31 against the force of spring 46 and, valve 38 is seated to close orifice 60 of passage 31. In contrast thereto, orifice 61 of passage 42 is uncovered and a fluid communication can take place between passages 42 and 44.

Figure 8:
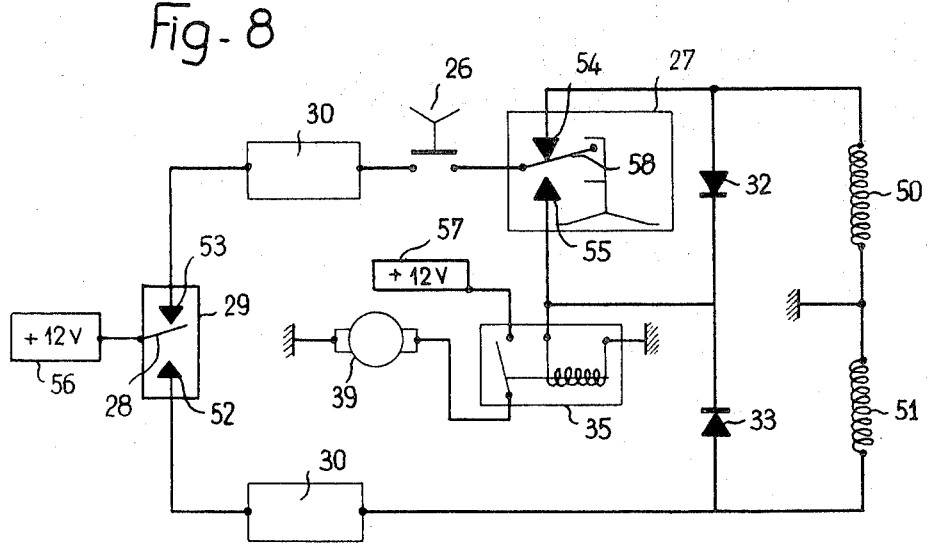
FIG. 8 is a block and wiring diagram of the corresponding electric circuit.

The device 29 for detecting the momentary level of the vehicle body and the time-lag device 30, which are shown in FIG. 8, are of a type known per se and notably through the U.S. Pat. No. 3,589,700 of June 29, 1971. According as the vehicle load is higher or lower than a predetermined threshold, a contact is closed between a movable contact arm 28 and the fixed contact studs 53 or 52, respectively, thus causing the energization of the corresponding solenoid-operated valve 50 or 51.

A pressure responsive switch 27 of the differential stroke type known per se is adapted to cause the current to flow either through contact stud 54 or through contact stud 55. Its movable contact arm 58 remains in engagement with the fixed contact stud 54 as long as the decreasing pressure in the vessel 1 remains above a minimum threshold, for example of 25 psi, and then switches to contact 55. Conversely, when the pressure rises in vessel 1, the contact with stud 55 is maintained as long as the pressure remains below a predetermined maximum value of, say, 33 psi, whereat the movable contact arm is returned to stud 54. In either case the relay 35 remains operative, thus causing the compressor 39 to be started. The diodes 32 and 33 control the direction of the current and a safety pressure-responsive switch 26 is adapted to cut off the supply of air to the compressor in case the pressure in actuators 2 oversteps a permissible threshold.

It is just assumed that normal requirements are met, that is, that the vessel 1 and actuators 2 are inflated at a sufficient value for the vehicle load.

A static overload then is introduced into the system in a state of equilibrium, thus causing a certain collapse of the suspension system. Reverting to FIG. 8, it will be seen that the movable contact arm 28 of detector 29 responsive to the height or level of the vehicle body engages a contact stud 53, thus permitting the passage of current from the positive terminal of the generator via the time lag device 30 and, the safety pressure-responsive switch 26. The pressure responsive switch 27 is restored to the position illustrated since the vessel 1 is under pressure, so that on the one hand the solenoid-operated valve 50 is operated and on the other hand, through the branch line comprising the diode 32, the compressor 39 is also operated via relay 35 energized to close the circuit comprising the generator 57. FIG. 5 illustrates the pneumatic circuit thus obtained.

The solenoid-operated valve 50 being thus energized, the valve member 38a will close the passage 31a connecting this valve to the outlet of compressor 6. On the other hand, with ball valve 41a in its uppermost position the suction of compressor 6 may be effective through passages 42a (not open) and 44a (connected to vessel 1). The non-return valve 25 prevents the gas from being vented to the atmosphere.

The compressed gas delivered by compressor 6 is directed into passage 31b of solenoid-operated valve 51 as a consequence of the compression of spring 46b and of the unseating of valve member 38b in passage 44b leading to actuators 2, so that these actuators are inflated.

Figure 5:
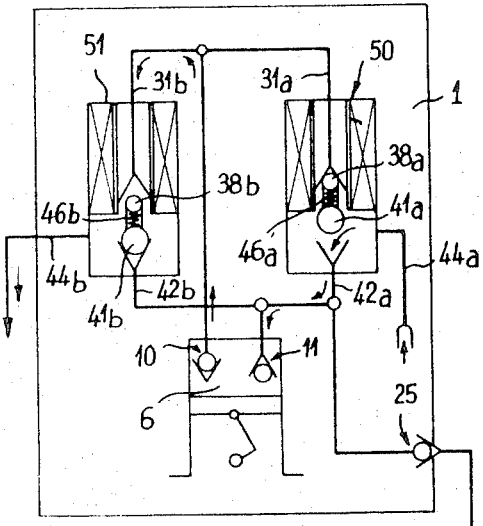
FIGS. 5, 6 and 7 are diagrammatic views of pneumatic means for controlling the cylinder and piston actuators, during the inflation and deflation thereof, and during the inflation of the storage vessel, respectively.

When the vehicle body has reached its normal trim or level, the movable contact member 29 moves away from contact stud 53 and the circuit of FIG. 5 is opened.

Now the preceding overload is removed, and since in this case the pressure in actuators 2 is too high for the new load value the vehicle body is too high. The contact is thus closed between arm 28 and stud 52. After the necessary time-lag, of the order of 15 seconds for instance, energizing current is delivered to solenoid-operated valve 51 and via a branch line passing through valve 33 the relay 35 is closed and starts the compressor. This new condition is illustrated in FIG. 6.

Upon energization of solenoid-operated valve 51, ball valve 41b is lifted off its seat 43, thus pushing the valve member 38b to close the passage 31b, while opening passages 44b and 42b through which the gas under pressure issuing from the actuators is caused to flow. This gas penetrates into the inlet port of compressor 6 and emerges therefrom through the outlet port 17 so as to subsequently flow towards the passage 31b of the still de-energized solenoid-operated valve 51. Since the gas pressure is higher than the pressure exerted by spring 46a on valve member 38a, the latter is opened, thus permitting the escape of gas towards the vessel through passage 44.

It will be noted that the pressure of the gas delivered by the compressor is lower than the electromagnetic force retaining the ball valve 41b of the energized valve 51.

Now let us consider the operation of the device when one fraction of the total mass of gas contained in the vessel and actuator assembly has escaped, or during the first loading of the trim corrector, as delivered from the assembly line.

If the vehicle body is too low, the contact is closed between arm 28 and stud 53 of detector 29. The current flows through the time-lag device 30, the safety pressure-responsive switch 26 and leads to the normal pressure-responsive switch 27. If sufficient air is still present in the vessel 1, i.e., if the pressure in this vessel is in excess of 33 psi, the movable contact arm 58 engages the stud 54 and, the trim is firstly corrected by transferring air from the vessel to the actuators.

The pressure in the vessel is thus reduced, so that the lower gaged pressure of switch 27 may be attained. Then contact arm 58 will switch to stud 55, thus energizing relay 35 and causing the compressor 39 to be started. It will be noted that no current is supplied to valves 50 and 51, due to the position of switch 27 and the relative arrangement of diodes 32 and 33. Therefore, these diodes are inoperative. This new condition is illustrated in FIG. 7.

The atmospheric air from intake 59 flows through the non-return valve 25 since only a moderate pressure prevails in the vessel and is received in the compressor. Air is delivered therefrom under a pressure capable of overcoming the force of springs 46a and 46b, lowering valve members 38a and 38b and simultaneously flow occurs via passage 44b into the actuators and via passage 44a into the vessel, in case of the first inflation of the system, i.e., when no pressure prevails in the actuators, or in the actuator supporting the least load, i.e., with the vessel under leakage condition.

When the pressure in the vessel becomes higher than the upper gaging pressure of pressure-responsive switch 27, which is, say, about 39 or 40 psi, the movable arm 58 re-engages the fixed contact stud 54.

According to the degree of inflation of the actuators, notably when the vehicle is to be operated for the first time, the pressure in these actuators is still too low and the vehicle body collapses, so that the detector assumes the position in which the movable contact arm 28 engages contact stud 53, so that the solenoid-operated valve 50 controlling the inflation of said actuators is energized, thus restoring the conditions illustrated in FIG. 5.

Figure 7:
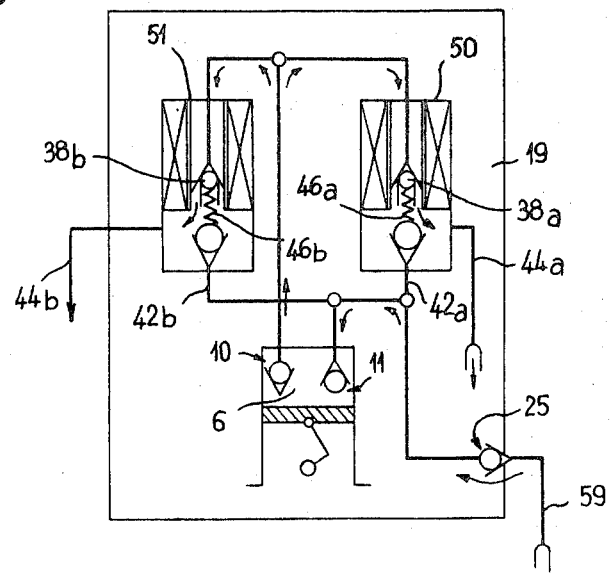

During this operation, the transfer of gas from the vessel to the actuators is attended by a reduction of the gas pressure in said vessel to a value lower than the lowermost gage value of switch 27, which is for instance of about 25 psi, thus causing the movable contact arm 58 to be switched and engage contact stud 55; therefore, the compressor is started to suck atmospheric air as shown in FIGS. 7 nd 8 and as described in the foregoing.

As already described hereinabove this sequence of operations takes place as long as the inner pressure of vessel 1 remains below the upper gaging pressure of switch 27, which is of the order of 40 psi, so as to cause the movable contact arm 58 to switch back to contact stud 54.

By successive approaches, i.e., by alternatively inflating the vessel with atmospheric air and then the actuators with air from said vessel, at a certain time the device 29 detecting the height of the vehicle body shows that it is no more necessary to inflate the actuators, and that no fresh or atmospheric air has to be introduced into the vessel. It will be seen that the time-lag is effective only once, during the first detection of an abnormally low vehicle body level; The successive approaches mentioned hereinabove are not subjected to a time-lag and take place in succession.

Figure 6:
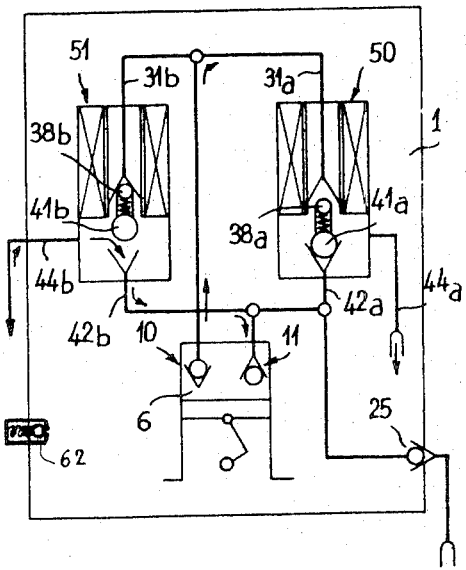

After the equilibrium between the vehicle load and the pressure prevailing in the actuators and vessel has been restored, only modifications resulting from changes in the static loads are necessary and take place according to the diagrammatic illustration of FIGS. 5 and 6, until, as a consequence of leakages, the pressure-responsive switch 27 causes a complementary amount of atmospheric air to be introduced into the vessel.

At the end of the correction phase no pressure gas accumulation can continue against the compressor piston, since this gas can escape by unseating ball valves 38a or 38b of solenoid-operated valves 50 or 51 in the vessel, or in the actuators, where the lowest pressure prevails. This facilitates the starting of the compressor while permitting the use of a low-torque apparatus.

Another advantage resulting from the application of this device to the suspension of a vehicle is found in the fact that the trim thereof is constantly adjusted to its optimum value, irrespective of its load, so that it is not necessary to provide a substantial allowance or margin between a no-load suspension beat and a full-load suspension beat, as required in the case of conventional suspension systems.

In FIG. 6 a gaged valve 62 is provided for venting air to the outside of vessel 1.

The function of this gaged valve 62 will now be explained with reference to the pneumatic and electric diagrams of the device, when the vehicle has received a main load and when a first partial load has been removed therefrom. The pressure prevailing in the actuators 2 is then too high for the new load value and therefore the vehicle level is too high. The movable contact arm 28 engages contact stud 52. After a time period of about 15 seconds, energizing currents are supplied to the solenoid-operated diode 51 and through valve 33 the relay 35 starts compressor 39. The vessel is inflated until the compressor is stopped under the control of detector 29.

Now if a second partial load is removed, the detector 29 will restart the compressor 39 and the latter, according to the above-described arrangement, would normally have to overcome the higher pressure prevailing in the vessel, since nearly all the mass of air is contained therein.

However, due to the presence of the overpressure valve 62 gaged at about 50 psi, the accumulation of air in the vessel during the preceding operation has been limited to a value lower than the value that would normally have been registered if this valve had not been provided, by venting to the atmosphere one fraction of the total amount of air contained in the device.

Thus, when restarting the compressor as required for restoring the trim subsequent to the removal of said second partial load, the power requirement for restarting the compressor is relatively low since its piston has only a moderate pressure to overcome. The volume of the vessel is so selected that mean complementary loads can be absorbed without causing air to be vented or rejected to the atmosphere, the pressure limitation in the vessel occurring only in case of extreme conditions.

If a complementary load is added to the vehicle, the gas is transferred in the opposite direction, i.e., from the vessel to the actuators. If the pressure of the air contained in the vessel becomes insufficient, say, of the order of 10 psi, if one fraction of the air had been vented to the atmosphere, the case is again that described hereinabove with reference to the detection of an insufficient air content due to leakages.

Atmospheric air is also introduced into the vessel after properly drying and purifying or filtering same by means of a valve 25, without energizing the valves 50, 51.

To set in sharp contrast the advantageous properties of the trim corrector of this invention, technical tests were carried out under the following conditions :

the useful volume of the vessel 1, depending on the geometry of the vehicle, is substantially of the order of one liter, and the total volume of the two actuators 2 is usually estimated to be of the same order of magnitude ;

the complementary load added before determining the first correction of the vehicle trim is of the order of 250 kilograms. The pressure in the actuators is then about 100 psi, the pressure in said vessel being then about 7¼ psi (relative pressures).

From these initial conditions, about 90 percent of the complementary load is removed; if the vessel is used without any over pressure valve, the new pressure is 87 psi in the vessel and 22 psi in the actuators, respectively.

The pressure differential produced between the vessel and actuators, which has to be overcome by the compressor when restarting, as a function of the new correction to be made if the remaining fraction of the complementary load is removed, is then 65 psi.

In this case, the torque demand of the compressor is of the order of 1.2 Newton/meter.

If the vessel is provided with an overpressure valve 62 gaged at 50 psi (relative pressure 7), the corresponding maximum pressure of the actuators will be 22 psi, that is, a pressure differential of 38 psi to be overcome by the compressor, to which corresponds a starting torque of 0.5 Newton/meter.

Since mass-produced compressor motors are relatively cheap, and have a driving torque not in excess of 0.8 Newton/meter, it is clear that the use of a safety overpressure valve gaged at 50 psi is sufficient for effecting the usual corrections.

In contrast thereto, in a device without such overpressure valve a more powerful motor must be used, which is obviously less economical. Therefore to a relatively moderate increment in the maximum torque there corresponds an increment of 2 to 3 times in the initial cost of the motor.

To sum up, the chief advantage of the improved device described hereinabove and illustrated in the accompanying drawing lies in the fact that it permits of the utilization of a low-power and therefore economical motor, and also less elaborate sealing means.

Although the present invention has been described with reference to specific forms of an embodiment, it

What is claimed as new is :

1. A closed circuit pneumatic device for correcting the trim of a motor vehicle, which comprises a vessel which accumulates gas under pressure, pneumatic actuators for controlling the trim of the vehicle, a single-acting power driven compressor including an inlet and outlet and having a moderate compression ratio for ensuring gas circulation, said power driven compressor being housed in said vessel under pressure and being started automatically when a transfer of gas becomes necessary, a vehicle body trim detector for controlling the operation of said power driven compressor, a time lag device associated with said detector, a differential, two-position pressure responsive switch responsive to the pressure in said vessel, and first and second three-way solenoid operated valves disposed in parallel, each said three-way valve being pneumatically connected through a first way to the compressor inlet and through a second way to the compressor outlet and, through a third way, said first valve being connected to said vessel and said second valve being connected to said pneumatic actuators, said trim detector generating signals for starting, through said pressure responsive device, said compressor and for controlling said first and second valves, said differential pressure responsive switch responsive to the gas pressure in said vessel being adapted to assume two different positions, namely a first position in which each of said first and second valves is energized simultaneously with said compressor starting and opening communication for transfer of gas from said vessel to said actuators, as long as the pressure in said vessel is higher than a minimum predetermined value, and a second position in which none of said solenoid operated valves are energized with said compressor driving, said second position corresponding to the introduction of additional atmospheric air into said vessel and pneumatic actuators, which is maintained as long as the pressure in said vessel remains lower than a predetermined maximum value.

2. A pneumatic correcting device according to claim 1, wherein said first and second three-way solenoid operated valves each comprise an electromagnet having a centrally disposed core enclosed in a case, a base member having discontinuous support means for supporting said case and provided with a pair of passages, of which one passage connected to said compressor outlet is normally closed in a fluid-tight manner by an O-ring and a ball valve, when the solenoid operated valve is not energized, a spring urging by one of its ends said ball valve against said O-ring and reacting with its other end against a cylindrical valve member, said cylindrical valve member being fitted in an axial passage formed in said core and adapted to close said passage connected to said compressor output, the lower end of said core comprising truncated fins of which the lower edges form together a frustoconical base engaging the top surface of said ball valve.

3. A pneumatic correcting device according to claim 1 in which the vessel enclosing the compressor further comprises a gaged overpressure valve for venting air to the atmosphere when the pressure in said vessel, notably during inflation of said pneumatic actuators, oversteps a predetermined threshold, thus permitting the use of a compressor having a low starting torque.

4. A pneumatic correcting device according to claim 3, in which said overpressure valve is gaged at 3.5 bars (50 psi) of relative pressure.

5. A pneumatic correcting device according to claim 3, in which the starting torque of said compressor is of the order of 0.5 Newton/m.

* * * * *